(12) United States Patent
Eisenhour

(10) Patent No.: US 10,343,491 B2
(45) Date of Patent: Jul. 9, 2019

(54) VEHICLE ACCESSORY POWER MANAGEMENT ASSEMBLY

(71) Applicant: Nissan North America, Inc., Franklin, TN (US)

(72) Inventor: Ronald S. Eisenhour, West Bloomfield, MI (US)

(73) Assignee: Nissan North America, Inc., Franklin, TN (US)

( * ) Notice: Subject to any disclaimer, the term of this patent is extended or adjusted under 35 U.S.C. 154(b) by 651 days.

(21) Appl. No.: 14/973,292

(22) Filed: Dec. 17, 2015

(65) Prior Publication Data

US 2017/0174048 A1    Jun. 22, 2017

(51) Int. Cl.

| | |
|---|---|
| *B60K 17/28* | (2006.01) |
| *B60H 1/32* | (2006.01) |
| *F16H 9/04* | (2006.01) |
| *F16H 61/02* | (2006.01) |
| *F02B 67/06* | (2006.01) |
| *F16H 3/54* | (2006.01) |
| *F16H 57/08* | (2006.01) |
| *F16H 48/08* | (2006.01) |

(52) U.S. Cl.
CPC .......... *B60H 1/3222* (2013.01); *B60K 17/28* (2013.01); *F02B 67/06* (2013.01); *F16H 3/54* (2013.01); *F16H 9/04* (2013.01); *F16H 61/0204* (2013.01); *B60H 1/3216* (2013.01); *B60Y 2400/87* (2013.01); *F16H 48/08* (2013.01); *F16H 57/08* (2013.01); *F16H 2200/0034* (2013.01)

(58) Field of Classification Search
CPC .............................. B60K 17/28; B60W 10/30
See application file for complete search history.

(56) References Cited

U.S. PATENT DOCUMENTS

| | | | |
|---|---|---|---|
| 7,617,904 B1 * | 11/2009 | Einboeck ................ | F16H 63/30 180/336 |
| 9,180,869 B2 * | 11/2015 | Harada ................... | B60K 6/445 |
| 9,393,953 B2 * | 7/2016 | Murata ..................... | B60K 6/30 |
| 9,527,375 B2 * | 12/2016 | Clark ........................ | B60K 6/26 |
| 9,650,032 B2 * | 5/2017 | Kotloski .................. | F16H 3/728 |
| 9,802,617 B1 * | 10/2017 | Eisenhour ......... | B60W 30/1886 |

FOREIGN PATENT DOCUMENTS

WO    WO-2005071819 A1 *   8/2005    ............. B60K 25/00

* cited by examiner

*Primary Examiner* — Nicole T Verley
(74) *Attorney, Agent, or Firm* — Global IP Counselors, LLP

(57) ABSTRACT

A vehicle accessory power management assembly has a power device, an accessory device, a power transmitting device and a controller. The power transmitting device has an input part coupled to the power device, an output part coupled to the accessory device, and a speed ratio switching part switchable between a first operating state in which the input part and the output part rotate at a first speed ratio relative to one another and a second operating state in which the input part and the output part rotate at a second speed ratio relative to one another. The controller is configured to switch the speed ratio switching part between the first operating state and the second operating state in response determining whether the speed of output of the power device is above a pre-determined value or below a pre-determined value.

13 Claims, 8 Drawing Sheets

VEHICLE ACCESSORY POWER MANAGEMENT ASSEMBLY

BACKGROUND

Field of the Invention

The present invention generally relates to a vehicle accessory power management assembly. More specifically, the present invention relates to a power transmitting device that changes the relative speed ratio between engine output and accessory input rotary power in response to a variety of vehicle related parameters.

Background Information

Vehicle power devices, such as internal combustion engines, typically provide rotary power to accessory devices, such as an air conditioning compressor, power steering and alternator, via a drive belt. An output shaft of the power device has a pulley that rotates with the output shaft, thereby moving the drive belt. The accessory devices also include respective pulleys connected to corresponding input shafts rotated by movement of the drive belt. In this drive belt arrangement, the rotational speed of the pulleys and input shafts of the accessory devices is directly related to the speed of the output shaft of the power device. If the power device is operating at a low RPM (revolutions per minute), the accessory devices are provided with rotary power at a corresponding low RPM. If the power device is operating at a high RPM, the accessory devices are provided with rotary power at a corresponding high RPM. However, there are circumstances where it is not necessary to provide an accessory device with high RPM power input while the power device is operating at a high RPM.

SUMMARY

One object of the present disclosure is to provide a vehicle power device with a power transmitting device having an input and an output where a ratio of input rotary speed to output rotary speed is changeable in response to changes in output speed of the power device.

In view of the state of the known technology, one aspect of the present disclosure is to provide a vehicle with a vehicle accessory power management assembly having a power device, an accessory device, a power transmitting device and a controller. The power device is configured to produce rotary power and has an output shaft. The accessory device is supported by the power device and has an input shaft. The power transmitting device has an input part coupled to the output shaft of the power device receiving rotational power therefrom, an output part coupled to input shaft of the accessory device transmitting rotational power thereto, and a speed ratio switching part that is switchable between a first operating state in which the input part and the output part rotate at a first speed ratio relative to one another and a second operating state in which the input part and the output part rotate at a second speed ratio relative to one another. The controller is connected to the power device and the power transmitting device. The controller is configured to switch the speed ratio switching part between the first operating state and the second operating state in response determining whether the speed of rotation of the output shaft is above a pre-determined value or below a pre-determined value.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
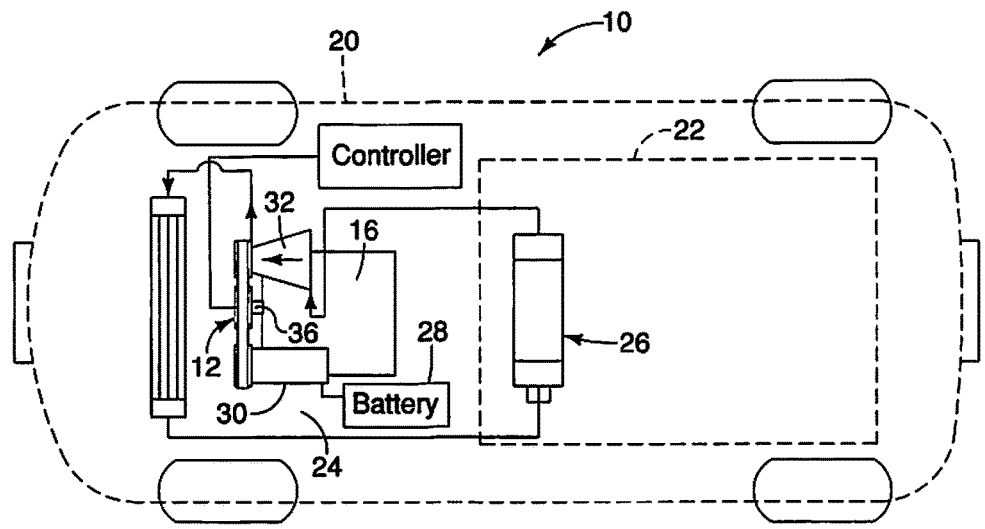
FIG. 1 is a schematic view of a vehicle that includes a power device that provides power to accessories via a power transmitting device in accordance with a first embodiment.

Referring initially to FIG. 1, a vehicle 10 having a vehicle accessory power management assembly 12 is illustrated in accordance with a first embodiment. The vehicle accessory management assembly 12 is configured to control the rotary speed of power provided to one or more vehicle accessories from a power device 16 in response to a variety of vehicle related parameters, such as changes in output rotary speed of the power device 16, as described further below.

As used herein, the term power device (i.e., the power device 16) specifically refers to a primary power producing mechanism within the vehicle 10, where the power device 16 provides propulsion torque that moves the vehicle 10. For example, the power device 16 can be any of a variety of power producing mechanisms, such as a diesel fuel internal combustion engine, a gasoline fuel internal combustion engine, a hydrogen powered engine (or fuel cell), an electric motor, or hybrid power plant that includes both an electric motor and a hydrocarbon fuel powered engine.

The vehicle 10 basically includes a vehicle body structure 20 that defines a passenger compartment 22 and an engine compartment 24. The vehicle 10 is further equipped with, for example, an air conditioning system 26, a battery 28 and an alternator 30. It should be understood from the drawings and the description herein that further accessories can be installed within the vehicle 10 that are provided with rotary power by the power device 16. However, for purposes of understanding and demonstrating the operation and purpose of the vehicle accessory management assembly 12, only the air conditioning system 26 and the alternator 30 are described herein, with further description of other accessories omitted for the sake of brevity.

The engine compartment 24 is a space provided for the installation of the power device 16, and powered accessories, such as a compressor 32 of the air conditioning system 26, the battery 28 and the alternator 30.

Figure 2:
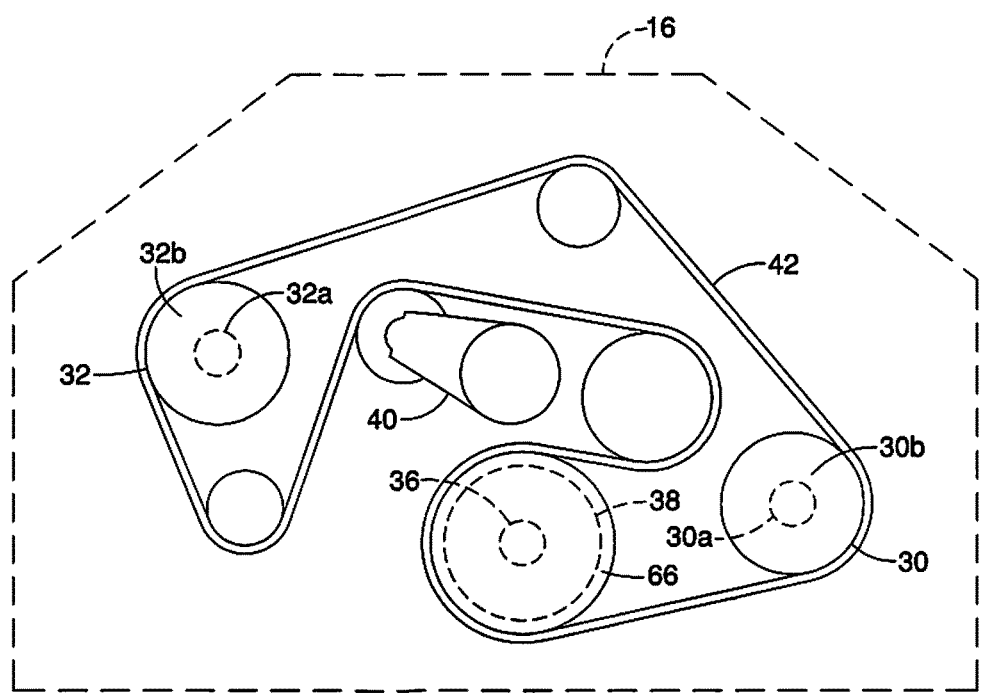
FIG. 2 is a schematic view of a front of the power device showing the power transmitting device with a pulley and drive belt arrangement that provides rotary power to the accessories of the vehicle in accordance with the first embodiment.

As shown schematically in FIG. 2, the power device 16 includes an output shaft 36, a power transmitting device 38 attached to the output shaft 36, a belt tensioner 40 and a drive belt 42. The power device 16 is configured to produce rotary power (torque) that powers a drive train (not shown) and propels wheels of the vehicle 10. Further, the output shaft 36 of the power device 16 provides rotary power to the accessories of the vehicle 10, such as the compressor 32 and the alternator 30 via the drive belt 42. Since the air conditioning system 26, the battery 28, the alternator 30, the belt tensioner 40 and the drive belt 42 are all conventional vehicle features, further description is omitted for the sake of brevity.

Figure 3:
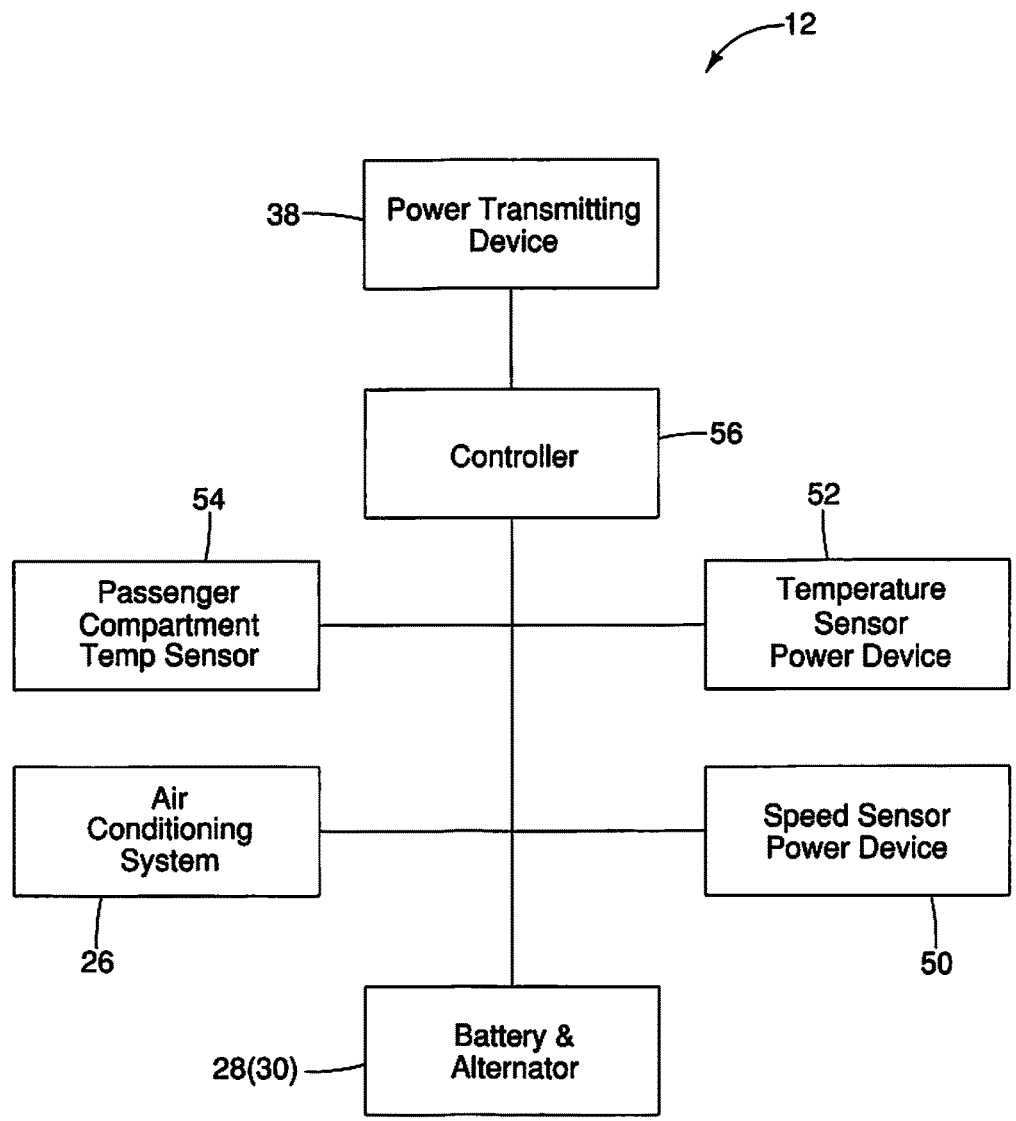
FIG. 3 is a schematic block diagram of an accessory power management assembly that includes a controller that operates the power transmitting device in accordance with the first embodiment.

As shown in FIG. 3, the vehicle accessory management assembly 12 basically includes a speed sensor 50, a power device temperature sensor 52, a passenger compartment temperature sensor 54 and the power transmitting device 38, that are all connected to a controller 56. As is described further below, the controller 56 is further connected to the battery 28 and alternator 30.

The speed sensor 50 is located on or within the power device 16 and detects the output rotational speed of the output shaft 36 in a conventional manner. The speed sensor 50 is connected to the controller 56 and transmits the current rotational speed of the output shaft 36 to the controller 56 during normal operation of the power device 16.

The power device temperature sensor 52 is also located on or within the power device 16 and detects the operating temperature of the power device 16 in a conventional manner. The power device temperature sensor 52 can include multiple temperature sensors depending upon the power device 16. For example, if the power device 16 is a hybrid power system, the power device temperature sensor 52 can include a sensor that detects operating temperature of the electric motor portion of the hybrid power system and a second sensor that detects operating temperature of the internal combustion engine portion of the hybrid power system. However, when the power device 16 is an internal combustion engine, it is possible that only a single temperature sensor is required, for example, a coolant sensor. The power device temperature sensor 52 is connected to the controller 56 and transmits the current operating temperature of the power device 16 to the controller 56 during normal operation of the power device 16.

The passenger compartment temperature sensor 54 can be part of the air conditioning system 26, or can be a separate temperature sensor installed within the passenger compartment. The passenger compartment temperature sensor 54 is located within the passenger compartment 22 or located within the air conditioning system 26 such that the passenger compartment temperature sensor 54 detects the current temperature of air within the passenger compartment 22, in a conventional manner. The passenger compartment temperature sensor 54 is connected to the controller 56 and transmits the current temperature of the passenger compartment 22 to the controller 56 during normal operation of the power device 16.

The air conditioning system 26 is also connected to the controller 56 such that the controller 56 can determine the operational status of the air conditioning system 26, and in particular, the operation of the compressor 32. It should be understood from the drawings and the description herein that the controller 56 can directly detect the operational status of the compressor 32 (compressing refrigerant or not operating) or can obtain the operation status of the compressor 32 from a separate controller that controls operation of the air conditioning system 26. The air conditioning system 26 is a conventional vehicle system and can be configured in any of a variety of ways, depending upon the type of vehicle and overall load demand required of the air conditioning system 26. The compressor 32 is accessory device directly supported to or on the power device 16 and has an input shaft 32a with a pulley 32b fixed thereto. The drive belt 42 engages the pulley 32b such that the compressor 32 can be provided with rotary power from the power device 16 in a manner described in greater detail below. Since air condition systems are conventional vehicle apparatus, further description is omitted for the sake of brevity.

The battery 28 and the alternator 30 are both electrically connected to the controller 56 such that the controller 56 can detect the operation status of the battery 28 and the alternator 30. For example, the controller 56 can determine the level of charge of the battery 28 and whether or not the battery 28 requires charging. Further the controller 56 is connected to the alternator 30 such that the controller 56 can determine whether or not the alternator 30 is currently being required to provide an appreciable amount of electric power output or is currently not required to provide electric power output. For example, when the battery 28 is at least partially depleted of its charge, the alternator 30 recharges the battery 28. When the battery 28 requires charging, the alternator 30 is required to output an appropriate level of electrical power to the battery 28, which is detected by the controller 56.

The alternator 30 is accessory device directly supported to or on the power device 16 and has an input shaft 30a with a pulley 30b fixed thereto. The drive belt 42 engages the pulley 30b such that the alternator 30 can be provided with rotary power from the power device 16 in a manner described in greater detail below.

A description of the power transmitting device 38 in accordance with a first embodiment is now provided with specific reference to FIGS. 4-9. The power transmitting device 38 has an input part 60, an output part 62, a speed ratio switching part 64 and a pulley 66. In the first embodiment, the input part 60 is, for example, a bolt or shaft that is directly coupled to the output shaft 36 of the power device 16 directly receiving rotational power therefrom. In other words, the input part 60 rotates in unison with the output shaft 36 of the power device 16. In the first embodiment, the input part 60 is fixedly attached to the output shaft 36 as a threaded mechanical fastener, but can alternatively be unitarily formed with the output shaft 36 of the power device 16 or press-fitted to the output shaft 36.

The output part 62 is, for example, a front carrier plate that is secured to the pulley 66 for rotation therewith. In other words, the output part 62 and the pulley 66 rotate in unison at the same speeds. Since the pulley 66 is engaged by the drive belt 42 and the drive belt 42 wraps around the pulley 30b and the pulley 32b, the output part 62 is directly coupled to the input shaft 30a of the alternator 30 and the input shaft 32a of the compressor 32 via the drive belt 42 providing rotary power thereto when the power device 16 is operating.

The speed ratio switching part 64 includes an electromagnetically actuated clutch 68 and a sun gear of a planetary gear device 70.

Figure 4:
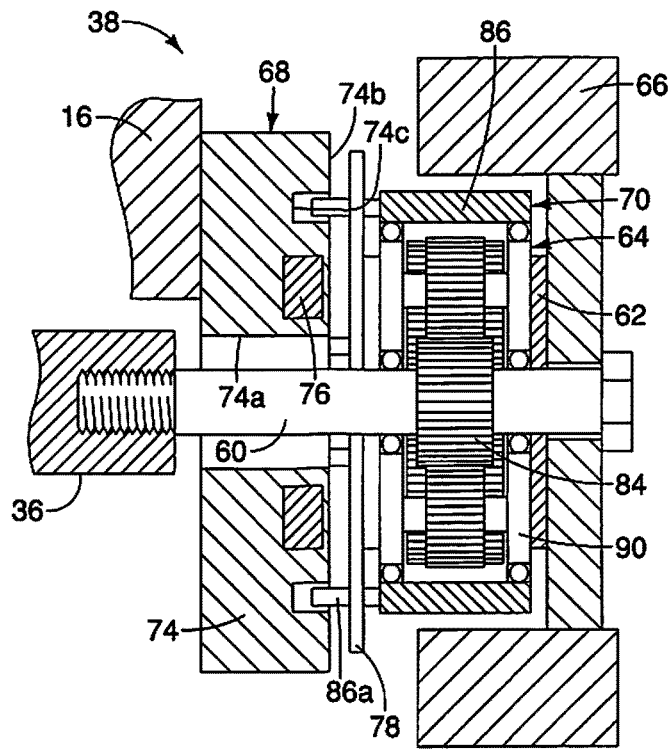
FIG. 4 is a schematic cross-sectional view of the power transmitting device supported by the power device showing details of an electromagnetically actuated clutch, a planetary gear device and a pulley, with a clutch plate of the electromagnetically actuated clutch in a first operating state (a disengaged orientation) in accordance with the first embodiment.
Figure 5:
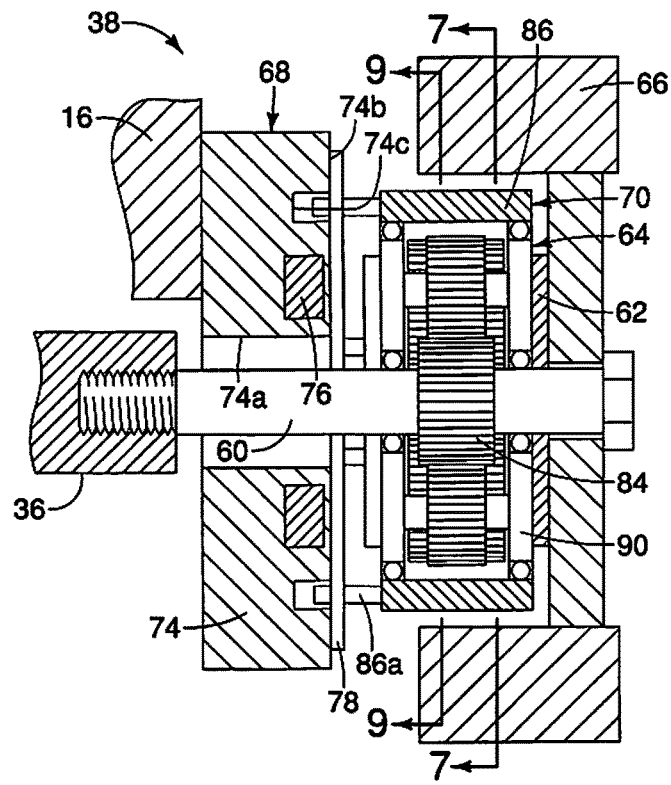
FIG. 5 is another schematic cross-sectional view of the power transmitting device similar to FIG. 4, showing the clutch plate of the electromagnetically actuated clutch in a second operating state (an engaged orientation) in accordance with the first embodiment.
Figure 6:
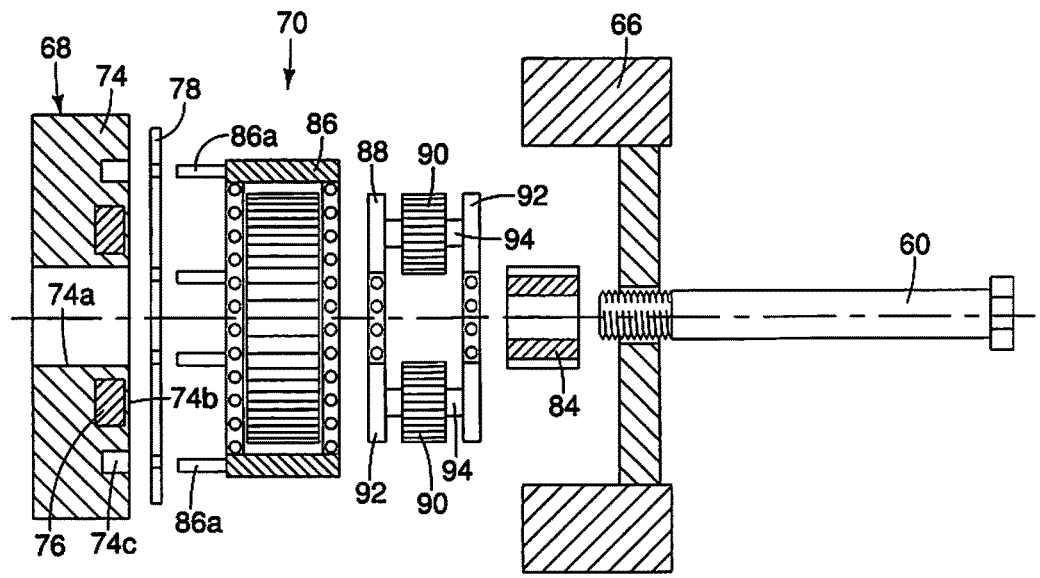
FIG. 6 is a schematic exploded cross-sectional view of the power transmitting device showing details of the electromagnetically actuated clutch and the planetary gear device in accordance with the first embodiment.
Figure 7:
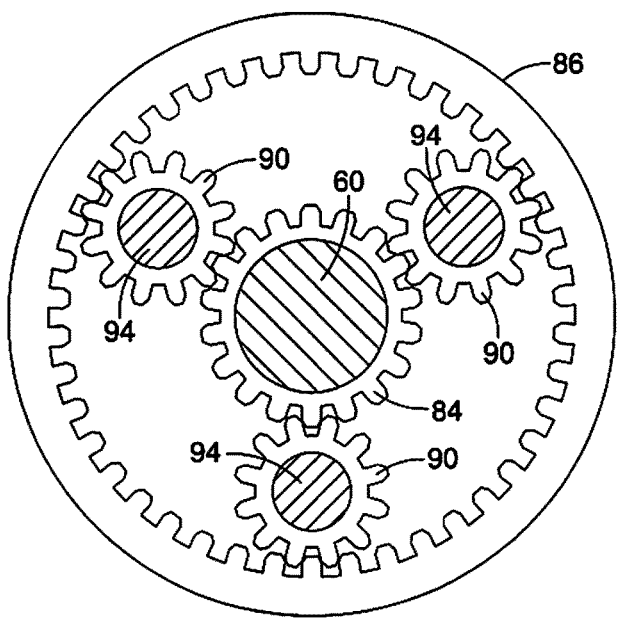
FIG. 7 is a schematic cross-sectional view of the planetary gear device of the power transmitting device taken along the line 7-7 in FIG. 5 in accordance with the first embodiment.
Figure 8:
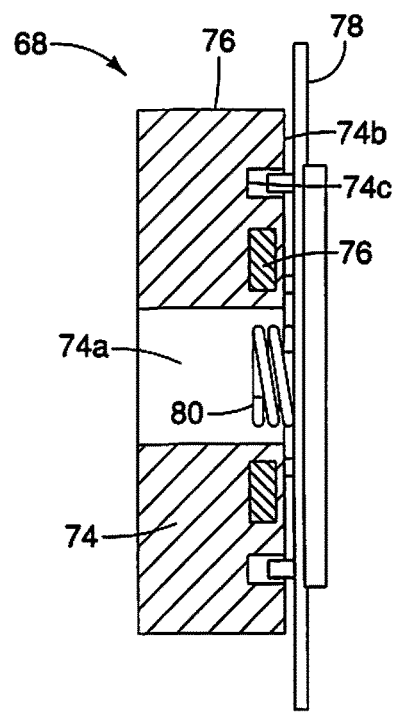
FIG. 8 is a cross-sectional view of the electromagnetically actuated clutch in accordance with the first embodiment.
Figure 9:
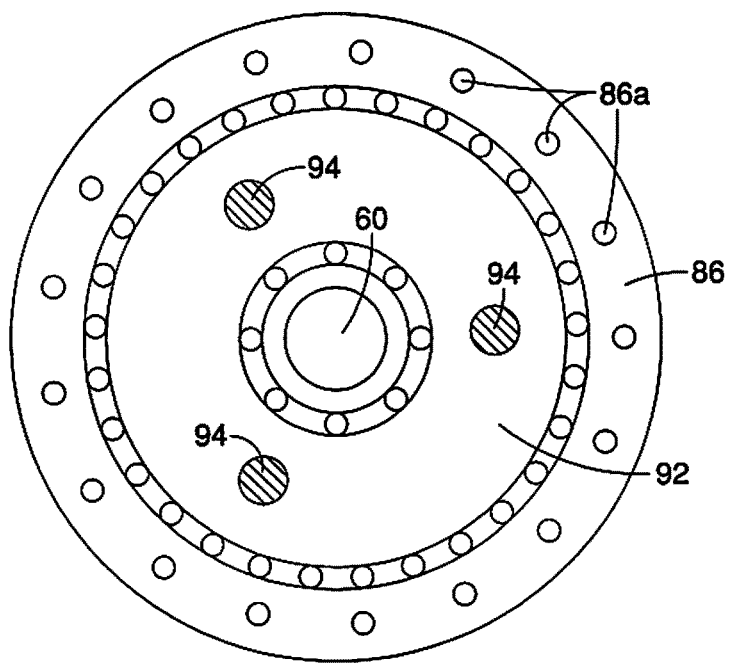
FIG. 9 is another cross-sectional view of the planetary gear device taken along the line 9-9 in FIG. 5 in accordance with the first embodiment.

As shown removed from the power transmitting device 38 in FIG. 8, the clutch 68 basically includes a base member 74, an electromagnet 76, a clutch plate 78 and a biasing member 80. The base member 74 is an annular shaped member that includes an annular recess that receives the electromagnet 76 and, as shown in FIGS. 4 and 5, also includes a central opening 74a through which the input part 60 extends. The base member 74 also defines a clutch surface 74b that is shaped and formed to engage the clutch plate 78 in a conventional manner. The clutch surface 74b can also include an annular concave portion 74c, as described in greater detail below.

As shown in FIGS. 4 and 5, the base member 74 of the clutch 68 is fixedly attached to the power device 16 (for example, the clutch 68 is bolted or otherwise non-movably fixed to an engine block of the power device 16). The base member 74 basically encircles the output shaft 36 of the power device 16 with the central opening 74a being aligned with a central axis of the output shaft 36. Hence, the base member 74 of the clutch 68 is non-movable relative to the power device 16. As shown in FIGS. 4 and 5, the clutch plate 78 is movable between a dis-engaged orientation (FIG. 4) and an engaged orientation (FIG. 5). Specifically, when the controller 56 causes the electromagnet 76 to be turned on (to generate an electromagnetic field), the clutch plate 78 is pulled into engagement with the clutch surface 74b of the base member 74 in a conventional manner. When the controller 56 causes the electromagnet 76 to be turned off (no electromagnetic field being generated), the clutch plate 78 is released and moves into engagement with the planetary gear device 70 in a manner described further below. The clutch plate 78 is moved away from the base member 74 via biasing force of the biasing member 80. The biasing member 80 has a first end with a bearing (not shown) that contacts either the power device 16 or the output shaft 36 and a second end in contact with the clutch plate 78 in a conventional manner. Since electromagnetically controlled clutches, such as the clutch 68 are conventional structures, further description is omitted for the sake of brevity.

A description of the planetary gear device 70 is now provided with specific reference to FIGS. 4-7 and 9. The planetary gear device 70 basically includes a sun gear 84, a ring gear 86, a planet gear carrier assembly 88 and planet gears 90.

The sun gear 84 is fixed to the input part 60 for rotation therewith. For example, the sun gear 84 can be press-fitted to the shaft of the input part 60, or can be provided with a keyway and fastener arrangement. Since the input part 60 is fixed to the output shaft 36 of the power device 16, the sun gear 84, the input part 60 and the output shaft 36 of the power device 16 all rotate together in unison as a single structure.

The ring gear 86 is an annular shaped member that includes gear teeth along its inner annular surface and a plurality of pins 86a that extend through apertures formed in the clutch plate 78. The pins 86a are rigidly fixed to the ring gear 86 by, for example, press-fitting engagement. The clutch plate 78 can move in an axial direction relative to a rotational axis thereof along the pins 86a. In other words, the clutch plate 78 is fixed to the ring gear 86 for rotation therewith but the clutch plate 78 can move between the dis-engaged orientation (FIG. 4) and the engaged orientation (FIG. 5) along the pins 86a relative to the ring gear 86, but cannot rotate relative to the ring gear 86. The pins 86a extend into the annular concave portion 74c of the base member 74, but do not contact the base member 74. Alternatively, the pins 86a can be made shorter so that they do not extend beyond the clutch plate 78 with the clutch plate 78 in the engaged orientation (FIG. 5).

The planet gear carrier assembly 88 basically includes carrier plates 92 and shafts 94. The carrier plates 92 are connected to one another by the shafts 94, which are rigidly fixed therebetween. The planet gears 90 are installed to the shafts 94 and rotate freely about the shafts 94.

As mentioned above, the clutch plate 78 and the ring gear 86 are coupled to one another via the pins 86a such that they rotate together as a single body. The sun gear 84 is fixed to the input part 60 such that sun gear 84 rotates with the output shaft 36. The planet gear carrier assembly 88 is supported within the ring gear 86 via, for example, bearings and is further supported on the input part 60 via additional bearings, such that, absent other forces, the planet gear carrier 88 and planet gears 90 can rotate within the ring gear 86 and around the sun gear 84. The planet gear carrier 88 (specifically, one of the carrier plates 92) is fixedly attached to the pulley 66 via the output part 62 for rotation therewith. In other words, the pulley 66, the output part 62 and the planet gear carrier 88 all rotate together as a single body. Alternatively, the output part 62 can be eliminated and the planet gear carrier 88 directly attached to the pulley 66, such that the planet gear carrier 88 defines the output part 62.

Consequently, when the clutch plate 78 is in the dis-engaged orientation (FIG. 4), the clutch plate 78 and the ring gear 86 are free to rotate relative to the power device 16. Further the clutch plate 78 locks the ring gear 86 to the planet gear carrier 88 when the clutch plate 78 is in the dis-engaged orientation (FIG. 4). As a result, the sun gear 84 and the ring gear 86 are locked together. Hence, the output shaft 36 of the power device 16 and the pulley 66 rotate at the same speed. With the clutch plate 78 in the disengaged orientation (FIG. 4), the power transmitting device 38 operates in a first operating state where the output shaft 36 of the power device 16 and the pulley 66 rotate at the same speed.

When the clutch plate 78 is in the engaged orientation (FIG. 5) the clutch plate 78 and the ring gear 86 are prevented from rotating relative to the power device 16. As a result, the sun gear 84 causes the planet gears 90 to rotate relative to the ring gear 86, which in turn causes the planet gear carrier 88 to rotate as a rate of speed that is less than the rotation speed of the output shaft 36 of the power device 16. With the clutch plate 78 in the engaged orientation (FIG. 5), the power transmitting device 38 operates in a second operating state where the power device 16 and the pulley 66 rotate at different speeds.

Consequently, in the first operating state (FIG. 4), the output shaft 36 of the power device 16 and the pulley 66 rotate at the same speed. In the second operating state (FIG. 5) the output shaft 36 of the power device 16 and the pulley 66 rotate at different speeds, with the pulley 66 rotating at a speed that is less than the output shaft 36. In other word, in the second operating state, the planetary gear device 70 reduces the output speed provided to the pulley 66.

The power transmitting device 38 is switchable between the first operating state in which the input part 60 and the output part 62 rotate at a first speed ratio relative to one another and the second operating state in which the input part 60 and the output part 62 rotate at a second speed ratio relative to one another. In the depicted embodiment, the first speed ratio is one to on (1:1) and the second speed ratio is such that the output part 62 rotates at a speed that is lower than the speed of the input part 60.

The power transmitting device 38 (specifically, the speed ratio switching part 64) is configured such that the first speed ratio between the input part 60 and the output part 62 is such that the input part 60 and the output part 62 rotate at the same speed, and the second speed ratio between the input part 60 and the output part 62 is such that the output part 62 rotates at a speed that is between $\frac{1}{3}^{rd}$ and $\frac{2}{3}^{rd}$ of the speed of the input part 60. In the depicted embodiment, if the electromagnetically actuated clutch 68 should fail to operate, the power transmitting device 38 operates in a default mode (i.e. the first speed ratio). However, it should be understood that, alternatively, the power transmitting device 38 can be re-configured such that the first speed ratio and the second speed ratio can be reversed with the first speed ratio being such that the output part 62 rotates at a speed that is between $\frac{1}{3}^{rd}$ and $\frac{2}{3}^{rd}$ of the speed of the input part 60, and in the second speed ratio the input part 60 and the output part 62 rotate at the same speed, with the first speed ratio being the default mode.

Figure 10:
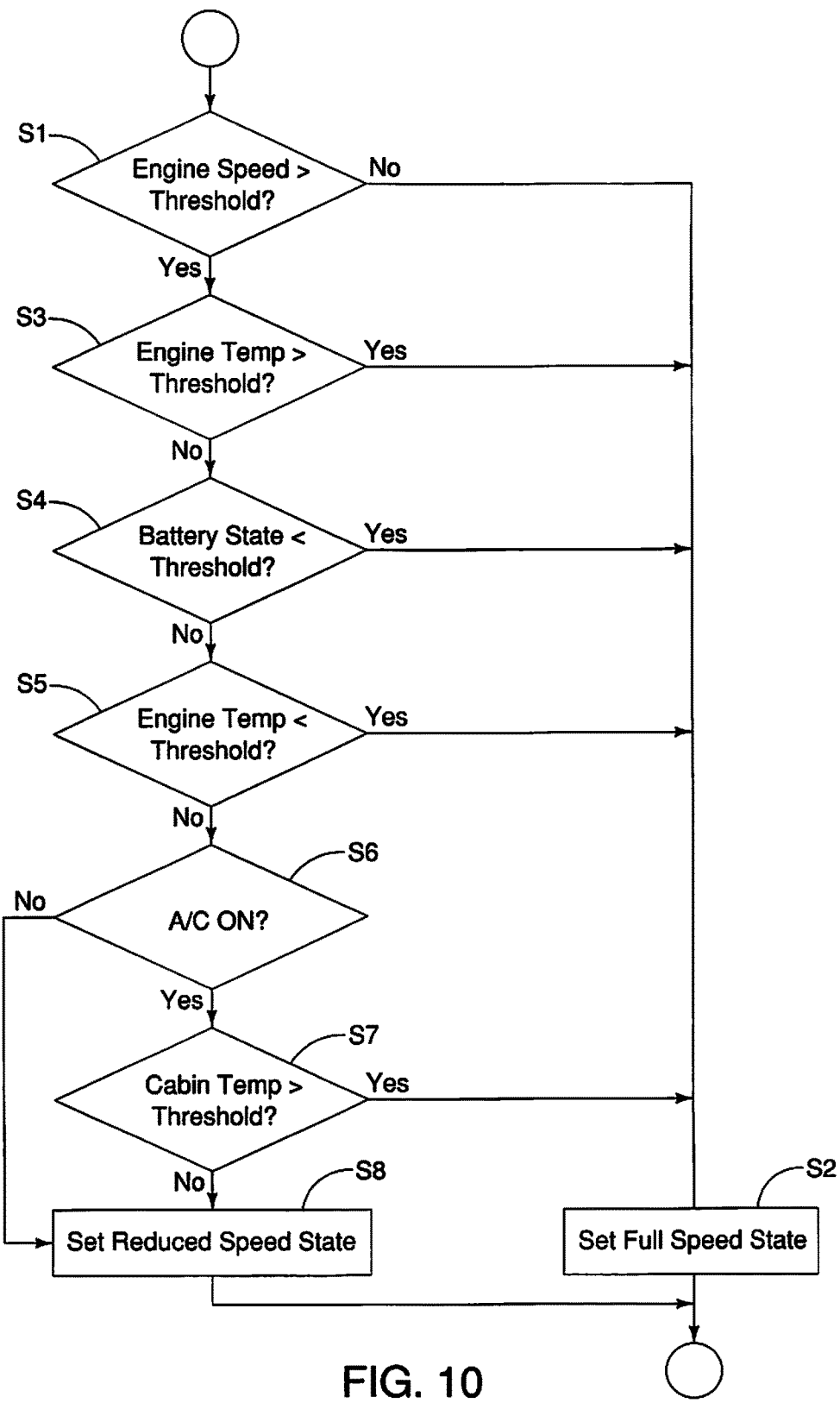
FIG. 10 is a flowchart showing basic operational steps conducted by the controller in the operation of the power device and the power transmitting device in accordance with the first embodiment.

A description of operation of the controller 56 is now provided with specific reference to FIG. 10. As mentioned above, the controller 56 is connected to the power device 16 and the power transmitting device 38. The controller 56 is configured to switch the speed ratio switching part 64 between the first operating state and the second operating state in response to determining a variety of operating conditions. Primarily, the controller 56 determines whether the speed of rotation of the output shaft 36 of the power device 16 is above a pre-determined value or below a pre-determined value. The pre-determined value depends upon the overall configuration of the power device 16 and can vary from engine configuration to engine configuration. One main consideration is that when the power device 16 is operating at a low RPM (for example, at an idle), accessories need to be rotated at a speed sufficient to operate normally. Consequently, at a low RPM, the controller 56 operates the speed ratio switching part 64 in the first operating state such that the pulley 66 rotates at the same speed as the output shaft 36 of the power device 16. When the power device 16 is operating at a high RPM (for example, heavy acceleration or passing speed), it is likely the accessories (the compressor 32 and the alternator 30) are provided with excessive torque that is unnecessary and overly taxes the power device 16. Therefore at a high RPM, the controller 56 operates the speed ratio switching part 64 in the second operating state such that the pulley 66 rotates at reduced speeds relative to the speed of the output shaft 36 of the power device 16.

The controller 56 is also connected to the air conditioning system 26 and/or the compressor 32. Accordingly, the controller 56 is configured to switch the speed ratio switching part 64 between the first operating state and the second operating state in response determining whether the air conditioning system 26 and/or the compressor 32 is in operation or not in operation.

The controller 56 is also connected to the power device temperature sensor 52 and is configured to switch the speed ratio switching part 64 between the first operating state and the second operating state in response determining whether the temperature of the power device 16 is above a pre-determined value or below a pre-determined value.

The controller 56 is also connected to the battery 28 and the alternator 30 and is configured to switch the speed ratio switching part 64 between the first operating state and the second operating state in response determining whether or not the battery 28 is in need of charging by the alternator 30 or heavy demands are being made on the alternator 30.

The controller 56 is also connected to the passenger compartment temperature sensor 54 and is configured to switch the speed ratio switching part 64 between the first operating state and the second operating state in response determining whether the temperature within the passenger compartment 22 is above a pre-determined value or below a pre-determined value and is in need of being cooled.

As shown in FIG. 10, the controller 56 follows basic logic steps in the control of the electromagnetically actuated clutch 68 of the power transmitting device 38. Specifically, at step S1, the controller 56 determines whether or not the engine speed (RPMs of the output shaft 36) is above a predetermined threshold or not. The specific threshold speed depends upon the configuration of the power device 16. For an internal combustion engine, that speed can be, for example 1800 RPMs, but can be lower or higher depending upon the overall design of the vehicle 10 and the demands expected of the power plate 16. Therefore, the threshold speed can range between 1000 RPM to 2500 RPM. As step S1, if the speed of the output shaft 36 is not greater than the threshold speed, then operation moves to step S2 where the first operating state is established or maintained. Specifically, in the first operating state, the electromagnetically actuated clutch 68 is dis-engaged and the speed of the pulley 66 is locked to the speed of the output shaft 36.

If, in step S1, if the speed of the output shaft 36 is greater than the threshold speed, then operation moves to step S3. In step S3, the controller 56 determines whether or not the temperature of the power device 16 (for example, engine temperature) is above a predetermined threshold. If the measured temperature is above the predetermined threshold, this is an indication of possible engine overheating. In this case, since one of the accessory devices can be a water pump needed to cool the engine, operation moves to step S2 where the first operating state is established or maintained. In step S3, the controller 56 determines that the temperature of the power device 16 is not above a predetermined threshold, operation moves to step S4.

At step S4, the controller 56 determines whether or not the charge state of the battery 28 is below a predetermined threshold. If the charge state of the battery 28 is below a predetermined threshold, indicating that the battery 28 needs to be charged by the alternator 30, operation moves again to step S2. If the charge state of the battery 28 is above the predetermined threshold, indicating that the battery 28 does not need charging, operation moves to step S5.

At step S5, the controller 56 determines whether or not the temperature of the power device 16 (for example, engine temperature) is below a second predetermined threshold. If the measured temperature is below the predetermined threshold, this is an indication that the engine is cold and needs to warm up. In this case, operation moves to step S2 where the first operating state is established or maintained. In step S5, if the controller 56 determines that the temperature of the power device 16 is not below the second predetermined threshold, operation moves to step S6.

As step S6, the controller 56 determines whether or not the air conditioning system 26 is in operation or not. For example, the controller 56 can determine whether or not the compressor 32 is in operation or not. If the controller 56 determines that the air conditioning system 26 is in operation, operation moves to step S7. At step S7, the controller 56 determines whether or not the passenger compartment (cabin) is above a predetermined temperature. In other words, is there a need for air conditioning or not? If, at step S7, the passenger compartment (cabin) is above the predetermined threshold, then operation moves to step S2. If, at step S7, the passenger compartment (cabin) is not above the predetermined threshold, then operation moves to step S8.

Returning to step S6, if the controller 56 determines that the air conditioning system 26 is in not operation, operation moves to step S8.

In step S8, the electromagnetically actuated clutch 68 is engaged causing operation in the second operating state where the pulley 66 is rotated at speeds that are reduced, as compared to the speed of the output shaft 36 of the power device 16.

In an alternative embodiment, the power transmitting device 38 is installed to any one of the accessory devices, such as the alternator 30 or the compressor 32. Still further, each of the accessory devices can be provided with its own power transmitting device 38 in order to individually controller the speed of rotary power being provided thereto.

Employing the power transmitting device 38 on the power device 16 provides the benefit of reducing the torque burden on the power device 16 caused by operation of the accessory devices, such as the compressor 32 and the alternator 30. When propulsion demands made on the power device 16 are greatest (heavy acceleration) the power transmitting device 38 can reduce the drain of torque on the power device 16 by operating in the second operating state by reducing the output speed of the pulley 66 relative to the speed of the output shaft 36.

Second Embodiment

Referring now to FIG. 11-19, a power transmitting device 138 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the power transmitting device 138 is installed within the vehicle 10 to the power device 16 in a manner that is the same as the installation of the power transmitting device 38 of the first embodiment. Since the structure of the vehicle 10, the power device 16 and the accessory devices is unchanged in the second embodiment, description of the vehicle 10, the power device 16 and the accessory devices is omitted for the sake of brevity.

In the second embodiment, the power transmitting device 138 includes an electromagnetically actuated clutch 168 and a differential gear device 170. The electromagnetically actuated clutch 168 includes the base member 74 as described above in the first embodiment, and a clutch plate 178. The base member 74, as in the first embodiment, is non-movably fixed to the power device 16 (for example, directly attached to the engine block of the power device 16). The operation of the electromagnetically actuated clutch 168 is identical to the electromagnetically actuated clutch 68 of the first embodiment. Therefore, further description of the electromagnetically actuated clutch 168 is omitted for the sake of brevity.

The differential gear device 170 includes a first gears 186*a* and 186*b*, second gears 188, a carrier shaft 189 and a carrier 190. The first gear 186*a* is a driven gear that is rigidly fixed to the output part 60. As with the first embodiment, the output part 60 is fixed to the output shaft 36 of the power device 16 such that the output shaft 36 of the power device 16, the output part 60 and the first gear 186*a* all rotate together as a single body. The second gears 188 rotate about the carrier shaft 189. The carrier shaft 189 is supported by the carrier 190. The carrier 190 is fixed to the pulley 66 such that the carrier 190, the carrier shaft 189 and the pulley 66 all rotate together as a single body.

The first gear 186*b* is fixed to a carrier plate 192 that includes pins 192*a* and a central apertures 192*b*. When the differential gear device 170 is fully assembled, the input part 60 extends through the central aperture 192*b* of the carrier plate 192 and extends through a central apertures 178*a* of the clutch plate 178. However, the carrier plate 192 and the clutch plate 178 are rotatable relative to the input part 60 absent operation of the electromagnetically actuated clutch 168.

The pins 192*a* of the carrier plate 192 extend through apertures 178*b* of the clutch plate 178. Consequently, the clutch plate 178, the carrier plate 192 and the first gear 186*b* all rotate together as a single body.

Figure 11:
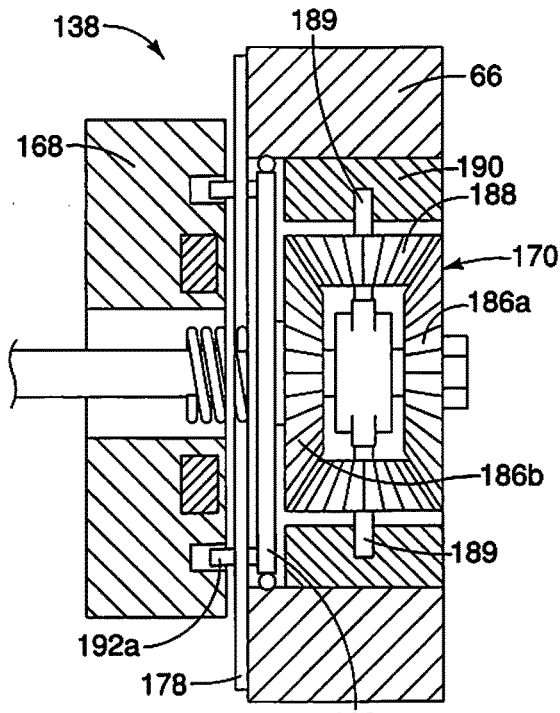
FIG. 11 is a schematic cross-sectional view of a power transmitting device showing details of an electromagnetically actuated clutch, a differential gear device and a pulley, with a clutch plate of the electromagnetically actuated clutch in a first operating state (a disengaged orientation) in accordance with a second embodiment.

As shown in FIG. 11 with the electromagnetically actuated clutch 168 in the dis-engaged orientation, the clutch plate 178 engages the pulley 66 and the carrier 190 such that the carrier 190, the carrier plate 192 the pulley 66 and the clutch plate 178 all rotate together as a single body thereby operating in the first operating state.

Figure 12:
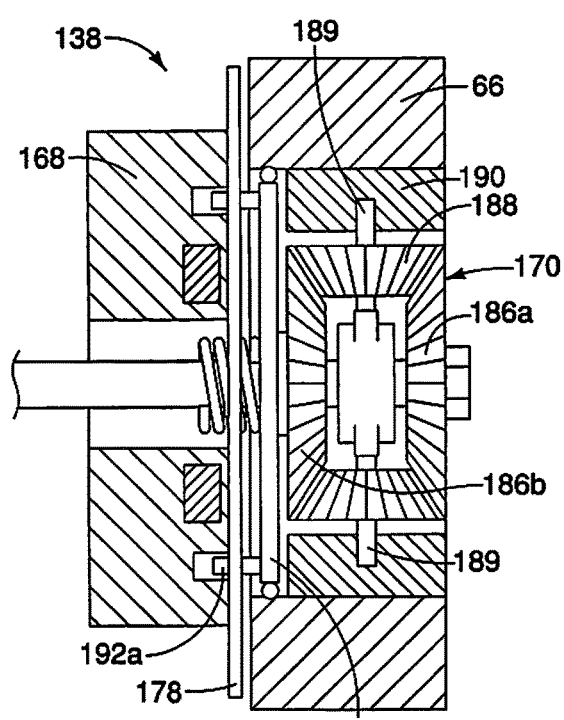
FIG. 12 is another schematic cross-sectional view of the power transmitting device similar to FIG. 11, showing the clutch plate of the electromagnetically actuated clutch in a second operating state (an engaged orientation) in accordance with the second embodiment.
Figure 13:
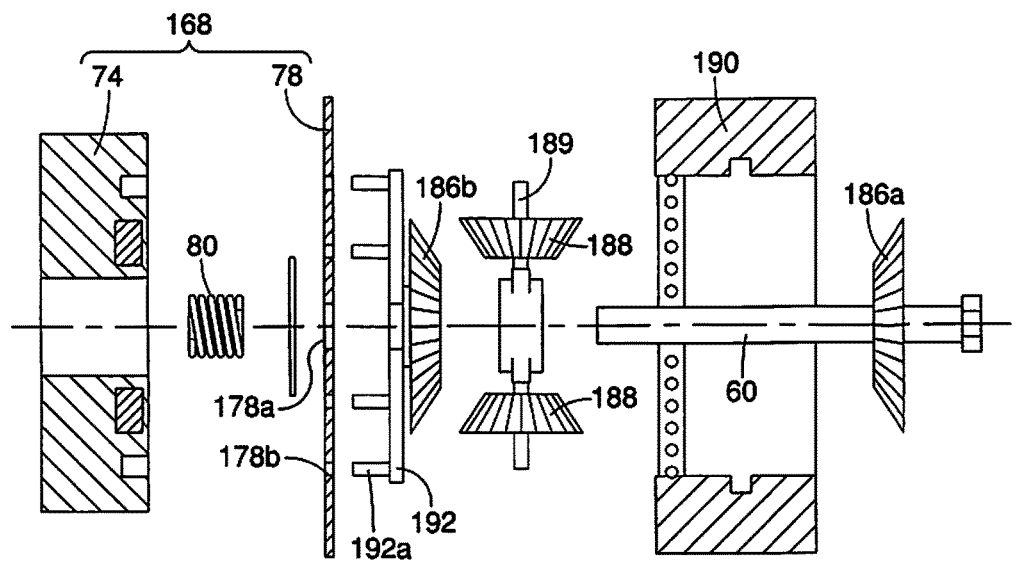
FIG. 13 is a schematic exploded cross-sectional view of the power transmitting device showing details of the electromagnetically actuated clutch and the differential gear device in accordance with the second embodiment.
Figure 14:
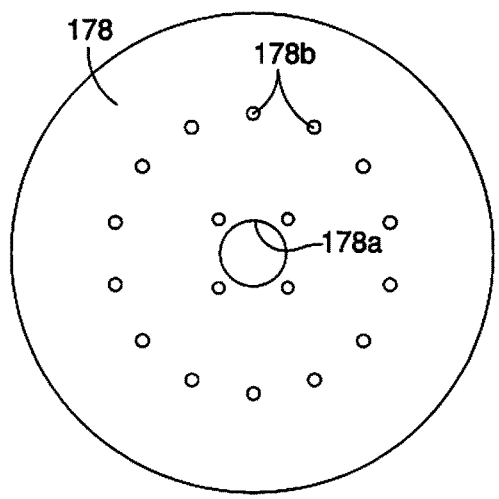
FIG. 14 is an end view of the clutch plate of the electromagnetically actuated clutch in accordance with the second embodiment.
Figure 15:
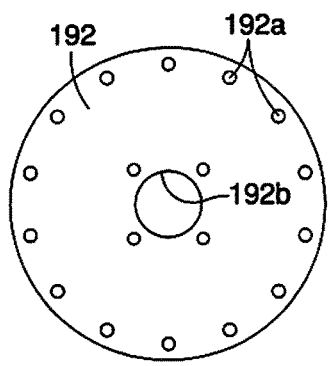
FIG. 15 is an end view of a support plate of the differential gear device in accordance with the second embodiment.

As shown in FIG. 12 with the electromagnetically actuated clutch 168 in the engaged orientation, the clutch plate 178 engages the base member 74 such that the clutch plate 178 and the carrier plate 192 and the first gear 186*b* are prevented from rotating, there by operating in the second operating state. In the second operating state, the first gear 186*a* is rotated by the input part 60, causing rotation of the second gears 188. Since the first gear 186*b* is prevented from rotating, the rotation of the second gears 188 causes the carrier 190 and the pulley 66 to rotate at a rate of speed that is less than the rotational speed of the input part 60.

The controller 56 preferably includes a microcomputer with a power transmitting device control program that controls the power transmitting device 38 as discussed below. The controller 56 can also include other conventional components such as an input interface circuit, an output interface circuit, and storage devices such as a ROM (Read Only Memory) device and a RAM (Random Access Memory) device. The microcomputer of the controller 56 is programmed to control the power transmitting device 38. The controller 56 is operatively coupled to the various parts of the vehicle 10 as describe above in a conventional manner. The internal RAM of the controller 56 stores statuses of operational flags and various control data. It will be apparent to those skilled in the art from this disclosure that the precise structure and algorithms for the controller can be any combination of hardware and software that will carry out the functions of the present invention.

The various vehicle elements and accessory devices are conventional components that are well known in the art. Since such elements and devices are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle accessory power management assembly. Accordingly, these terms, as utilized to describe the present invention should be interpreted relative to a vehicle equipped with the vehicle accessory power management assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle accessory power management assembly, comprising:
    a power device configured to produce rotary power and having an output shaft;
    an accessory device supported to the power device and having an input shaft;
    a power transmitting device that includes a planetary gear mechanism having a sun gear and planetary gears, the sun gear being an input part directly attached to the output shaft of the power device for rotation therewith and receiving rotational power therefrom, the planetary gears being coupled to an output part that is further coupled to input shaft of the accessory device transmitting rotational power thereto, and a speed ratio switching part that is switchable between a first operating state in which the input part and the output part rotate at a first speed ratio relative to one another and a second operating state in which the input part and the output part rotate at a second speed ratio relative to one another; and
    a controller connected to the power device and the power transmitting device, the controller being configured to switch the speed ratio switching part between the first operating state and the second operating state in response determining whether the speed of rotation of the output shaft is above a pre-determined value or below a pre-determined value.

2. The vehicle accessory power management assembly according to claim 1, wherein
    the speed ratio switching part is configured such that the first speed ratio between the input part and the output part is such that the input part and the output part rotate at the same speed, and the second speed ratio between the input part and the output part is such that the output part rotates at a speed that is between $\frac{1}{3}^{rd}$ and $\frac{2}{3}^{rd}$ of the speed of the input part.

3. The vehicle accessory power management assembly according to claim 1, wherein
    the power transmitting device includes an electromagnetically actuated clutch such that with the electromagnetically actuated clutch in a de-activated state the power transmitting device operates in the first operating state and in the activated state the power transmitting device operates in the second operating state.

4. The vehicle accessory power management assembly according to claim 1, wherein
    the power transmitting device includes an electromagnetically actuated clutch such that with the electromagnetically actuated clutch in a de-activated state the power transmitting device operates in the first operating state and in the activated state the power transmitting device operates in the second operating state.

5. The vehicle accessory power management assembly according to claim 1, further comprising
a first pulley directly connected to the output part of the power transmitting device;
a second pulley directly connected to the input shaft of the power transmitting device; and
an endless belt that extends around respective portions of both the first pulley and the second pulley.

6. The vehicle accessory power management assembly according to claim 1, wherein
the power transmitting device is installed to the power device.

7. The vehicle accessory power management assembly according to claim 1, wherein
the accessory device is an air conditioning compressor of an air conditioning system.

8. The vehicle accessory power management assembly according to claim 7, wherein
the controller is also connected to the air conditioning system, the controller being configured to switch the speed ratio switching part between the first operating state and the second operating state in response determining whether the air conditioning system is in operation or not in operation.

9. The vehicle accessory power management assembly according to claim 1, further comprising
a temperature sensor configured to measure the operating temperature of the power device, and wherein
the controller is also connected to the temperature sensor, the controller being configured to switch the speed ratio switching part between the first operating state and the second operating state in response determining whether the temperature of the power device is above a pre-determined value or below a pre-determined value.

10. The vehicle accessory power management assembly according to claim 1, further comprising
a battery electrically connected to the power device, and wherein
the accessory device is an alternator configured to charge the battery, and
the controller is also connected to the battery and the alternator, the controller being configured to switch the speed ratio switching part between the first operating state and the second operating state in response determining whether or not the battery is in need of charging by the alternator.

11. The vehicle accessory power management assembly according to claim 10, further comprising
a second accessory device, the second accessory device being an air conditioning compressor of an air conditioning system, the second accessory device also being supplied with rotary power via the output part of the power transmitting device.

12. The vehicle accessory power management assembly according to claim 11, wherein
the controller is also connected to the air conditioning system, the controller being configured to switch the speed ratio switching part between the first operating state and the second operating state in response determining whether the air conditioning system is in operation or not in operation.

13. The vehicle accessory power management assembly according to claim 10, further comprising
a temperature sensor configured to measure the operating temperature of the power device, and wherein
the controller is also connected to the temperature sensor, the controller being configured to switch the speed ratio switching part between the first operating state and the second operating state in response determining whether the temperature of the power device is above a pre-determined value or below a pre-determined value.

\* \* \* \* \*